US008758900B2

(12) United States Patent
Sekine et al.

(10) Patent No.: US 8,758,900 B2
(45) Date of Patent: Jun. 24, 2014

(54) SPHERICAL PARTICLES HAVING NANOMETER SIZE, CRYSTALLINE STRUCTURE, AND GOOD SPHERICITY AND METHOD FOR PRODUCING THE SAME

(75) Inventors: Shigenobu Sekine, Tokyo (JP); Yurina Sekine, Tokyo (JP)

(73) Assignee: Napra Co., Ltd., Tokyo (JP)

( * ) Notice: Subject to any disclaimer, the term of this patent is extended or adjusted under 35 U.S.C. 154(b) by 0 days.

(21) Appl. No.: 12/801,195

(22) Filed: May 27, 2010

(65) Prior Publication Data
US 2010/0239863 A1 Sep. 23, 2010

Related U.S. Application Data

(62) Division of application No. 11/836,457, filed on Aug. 9, 2007, now Pat. No. 7,803,210.

(60) Provisional application No. 60/836,407, filed on Aug. 9, 2006.

(51) Int. Cl.
*B22F 1/00* (2006.01)
*C01B 33/02* (2006.01)
*B22F 9/08* (2006.01)

(52) U.S. Cl.
CPC .............. *B22F 9/08* (2013.01); *C01P 2002/60* (2013.01); *C01P 2002/90* (2013.01); *C01P 2004/32* (2013.01)
USPC ................. 428/570; 75/343; 75/346; 75/351; 423/348; 428/402

(58) Field of Classification Search
USPC .................... 428/570, 402; 75/343, 346, 351; 423/348
See application file for complete search history.

(56) References Cited

U.S. PATENT DOCUMENTS

| 5,248,556 | A | * | 9/1993 | Matijevic et al. | 428/403 |
| 5,549,973 | A | * | 8/1996 | Majetich et al. | 428/403 |
| 6,808,568 | B2 | | 10/2004 | Sekine | |
| 7,446,335 | B2 | | 11/2008 | Kortshagen et al. | |
| 7,744,673 | B2 | * | 6/2010 | Jiang et al. | 75/348 |
| 7,803,210 | B2 | * | 9/2010 | Sekine et al. | 75/334 |
| 2002/0074565 | A1 | * | 6/2002 | Flagan et al. | 257/200 |
| 2004/0247503 | A1 | * | 12/2004 | Hyeon | 423/1 |
| 2007/0204724 | A1 | * | 9/2007 | Hampden-Smith et al. | 75/351 |
| 2007/0277648 | A1 | * | 12/2007 | Paserin et al. | 75/346 |
| 2008/0038555 | A1 | * | 2/2008 | Sekine et al. | 428/402 |

FOREIGN PATENT DOCUMENTS

JP 2004-35398 A 2/2004
JP 2005-320195 A 11/2005

OTHER PUBLICATIONS

Wang & Xiao, Morpohlogy tuning in nontemplated solvothermal synthesis of titania nanoparticles, J. Mater. Res., vol. 21, No. 5, May 2006, 1189-1203.*

(Continued)

*Primary Examiner* — Hoa (Holly) Le
(74) *Attorney, Agent, or Firm* — Westerman, Hattori, Daniels & Adrian, LLP

(57) ABSTRACT

The present invention provides nanometer-size spherical particles. Each of the particles is made of at least one selected from the group consisting of a metal, an alloy, and a metal compound. The particles include one or both of a polycrystalline region and a single-crystalline region. The particles have a particle size of less than 1 μm; and a sphericity of −10% to +10%.

6 Claims, 18 Drawing Sheets

(56) References Cited

OTHER PUBLICATIONS

Ledoux et al., Photoluminescence of size-separated silicon nanocrystals: Confirmation of quantum confinement, Appl. Phys. Lett., vol. 80, No. 25, Jun. 2002, 4833-4836. [DOI: 10.1063/1.1485302].*

He, Tao et al., "Characterization of Crystalline Nanoparticles/Nanorods Synthesized by Atmospheric Plasma Enhanced Chemical Vapor Deposition of Perfluorohexane," Plasma Science Technology, 2008, 10706.

* cited by examiner

SPHERICAL PARTICLES HAVING NANOMETER SIZE, CRYSTALLINE STRUCTURE, AND GOOD SPHERICITY AND METHOD FOR PRODUCING THE SAME

CROSS-REFERENCE TO RELATED APPLICATIONS

This application is a division of U.S. application Ser. No. 11/836,457, filed on Aug. 9, 2007, now U.S. Pat. No. 7,803,210, which is based upon and claims the benefit of priority from the prior U.S. Provisional Application No. 60/836,407, filed on Aug. 9, 2006, the entire contents of which are incorporated herein by reference.

BACKGROUND OF THE INVENTION

1. Field of the Invention

The present invention relates to nanometer-size spherical particles having a size of about 1 µm or less, a sphericity of about −10% to +10%. The present invention also relates to nanometer-size spherical particles having a composite structure. The present invention also relates to a method for producing such particles.

2. Description of the Related Art

Particles of various metals, alloys, metal oxides, metal nitrides, metal silicides, or mixtures of these materials have been used for various applications such as magnets, catalysts, electrode materials, battery materials, cold insulators, fire-resistant materials, and sintered metal materials.

These materials have been researched to improve their properties. The research has shown that the use of fine particles having good sphericity and a nanometer size is effective in enhancing their properties. For example, normal copper particles have a melting point of 1,083° C.; however, nanometer-size copper particles are known to have a melting point of about 200° C. Normal silver particles have a melting point of 962° C.; however, silver particles with a size of about 20 nm are known to have a melting point of about 150° C. It is known that amorphous materials have properties inferior to those of crystalline materials. In consideration of the industrial use of the nanometer-size spherical particles, the yield (the percentage of the amount of nano-particles having a target size with respect to the amount of input raw materials) of a final product must be improved.

In conventional methods, the sphericity of the nanometer-size particles is inferior. The particles with inferior sphericity can be readily oxidized; hence, these particles are unsuitable for practical use. Since crystal structures are broken during the reduction in particle site, only fine amorphous particles can be obtained by the conventional methods. In some situation, particles including a crystalline region are useful in view of good properties.

The microscopic structure of particles is one of factors in determining properties of the above materials along with the composition, shape, and size thereof. Recently, particles whose microstructure consists of two or more regions or components (composite structure) have been focused on and researched for various applications.

Japanese Unexamined Patent Application Publication No. 2005-320195 filed by the inventors of the present invention discloses a method for producing silicon particles having a polycrystalline structure, including a composite structure.

Japanese Unexamined Patent Application Publication No. 2005-320195 discloses that the silicon particles have a composite structure and a particle size of 50 nm to 10 µm. The silicon particles have no spherical shape but an irregular shape. A final product obtained by the method is limited to the silicon particles. The publication does not disclose that the method can be used to produce fine particles of various metals, alloys, metal oxides, metal nitrides, metal silicides, or mixtures of these materials. The publication discloses amorphous structures but does not disclose crystalline structure.

Japanese Unexamined Patent Application Publication No. 2004-35398 discloses a method for producing fine particles by plasma-treating a starting material. The starting material is plasma-treated in such a manner that the starting material is placed outside an arc flame. These fine particles have a diameter of 100 nm to 20 µM. These fine particles have a wide size distribution. Furthermore, these fine particles have low sphericity and the yield thereof is insufficient for industrial use.

U.S. Pat. No. 6,808,568, owned by the inventors of the present invention, relates to particles having a composite structure and a sphericity of about −10% to +10%. The disclosed method can form completely spherical particles. The patent discloses metal particles having a composite structure. The metal particles are those having a size of 1 to 300 µm, that is, micrometer-size spherical particles. In the specification of the present invention, the particles having such a size are hereinafter generically referred to as an intermediate product. However, the US patent does not disclose any nanometer-size particles.

In conventional methods, nanometer-size particles having a sphericity of about −10% to +10% cannot be produced.

SUMMARY OF THE INVENTION

It is an object of the present invention to provide spherical nanometer-size particles and to provide a method for producing the particles. The spherical particles have various compositions, having a sphericity of about −10% to +10%.

It is another object of the present invention to broaden the selection of the composition of a starting material, to provide nanometer-size spherical particles suitable for devices having various functions.

It is yet another object of the present invention to provide a method for producing nanometer-size spherical particles at a yield sufficient for industrial use.

In order to solve the above problems, nanometer-size spherical particles according to the present invention comprise a metal material at least one selected from the group consisting of a metal, an alloy, and a metal compound. The metal material can be a polycrystalline region and/or a single-crystalline. The particles have a size of less than 1 µm and a sphericity of −10% to +10%.

The nanometer-size spherical particles of the present invention can have a composite structure. The composite structure can be a homogenous mixture of an amorphous regions and crystalline regions. Each region has a size of less than 500 nm, and is homogenously mixed.

In the nanometer-size spherical particles, the metal compound can be at least one selected from the group consisting of a metal oxide, a metal silicide, a metal nitride, a metal carbide, and a metal sulfide.

Before the present invention, no spherical particles exist which has a composite structure, a particle size of less than 300 µm, and a sphericity of about −10% to +10%. The present invention provides the nanometer-size spherical particles. The nanometer-size spherical particles according to the present invention provide industrial advantages as described below; hence, the present invention has an inventive step.

When the nanometer-size spherical particles have the composite structure, the nanometer-size spherical particles have better properties, compared to particles without composite structure. When polycrystalline or single-crystalline regions included in the composite structure have a size of 200 nm or less, advantages can be obtained. In the present invention, the term "composite structure" means a structure in which at least two regions are mixed homogenously. The particles can include amorphous regions. The particles can include either the polycrystalline or single-crystalline regions or both of the polycrystalline and single-crystalline regions. The nanometer-size spherical particles have a size of less than 1 μm and include homogenously mixed region, the size of each region having a size of 500 nm or less. The observation of the cross section of the nanometer-size spherical particles can confirm that the regions included in the particles are arranged in a grid pattern at intervals of about 0.3 nm.

Since the nanometer-size spherical particles have a size of less than 1 μm, the nanometer-size spherical particles have good properties. In one embodiment, the nanometer-size spherical particles can have a particle size of 200 nm or less. In another embodiment, the nanometer-size spherical particles can have a particle size of 200 nm or less and 1 nm or more.

The nanometer-size spherical particles have a sphericity of −10% to +10%. In one embodiment, the nanometer-size spherical particles can have a sphericity of −3% to +3%. This sphericity means that the nanometer-size spherical particles have substantially a complete spherical shape. This allows the surface state of the nanometer-size spherical particles to be stable, avoiding the oxidation so as to improve properties as compared to conventional spherical particles.

The nanometer-size spherical particles have such superior properties and therefore are useful in manufacturing high-efficiency elements or devices having various functions. In particular, the nanometer-size spherical particles are useful in manufacturing fine wires and through connections for electric or electronic devices; semiconductor photoelectric transducers, such as solar cells and charge-coupled devices, having high efficiency; reflective plates having high hardness; non-oil grease; luminescent materials having high brightness; and the like.

A method for producing nanometer-size spherical particles includes a first step of producing an intermediate product and a second step for producing the final product. The first step includes producing spherical particles by melting a starting material, feeding the molten starting material onto a dish-shaped disk rotating at high speed which is placed in an argon inert atmosphere, atomizing the molten starting material into fine droplets by the action of centrifugal force, and then bringing the fine droplets into contact with an inert atmosphere to quench the fine droplets. The final product includes fine spherical particles having a sphericity of −10% to +10%. The second step includes carrying out a plasma-treatment in which the spherical particles of the intermediate product are collided with argon ions in a plasma swirl and brought into contact with a gaseous or vapor component. The spherical particles of the intermediate product are converted into a substantially complete spherical shape. Alternatively, the spherical particles of the intermediate product are chemically converted into the nanometer-size spherical particles of the final product of a metal compound. A chemical reaction used herein depends on the reaction conditions such as a reaction gas. Examples of the chemical reaction include sulfurization, nitrogenation, carbonization, and oxidation.

The intermediate product used for producing the final product (that is, the nanometer-size spherical particles) contains a metal, an alloy, an oxide, a silicide, a nitride, a carbide, or a sulfide. The intermediate product can contain carbon or carbon allotrope. The metal and the alloy can have a melting point of 20° C. to 2,300° C. The intermediate product can contain an alloy principally containing tin, a semiconductor material such as silicon, an alloy containing a rare-earth metal, or a metal such as boron.

The first step of the present invention is associated with the method disclosed in U.S. Pat. No. 6,808,568. The description of U.S. Pat. No. 6,808,568 is incorporated in the specification of the present invention. By using the intermediate products as prepared in U.S. Pat. No. 6,808,568, the final product (spherical nanometer-size particles) can be produced. The starting material can be a metal or alloy. The size of the starting material is not particularly limited because the starting material is molten in the first step.

The particle size obtained in the first step can be 1 to 300 μm, and in particular, 1 to 20 μm, and in particular, about 20 μm. The spherical particles, produced in the first step, can be produced into the final nonometer-size particles at high yield. The micrometer-size particles (intermediate product) can be of a metal or an alloy including Sn, Si, B or rare earth metals.

An example of the apparatus used in the second step is described below in detail with reference to a drawing.

In the second step, the intermediate product collides with the argon ions as described above. In the second step, 90% or more of the spherical particles of the intermediate product can be converted into the nanometer-size spherical particles of the final product. The size of the nanometer-size spherical particles can be controlled by the output of plasma. A metal compound can be produced depending on a gas inside the chamber. The composition of the final product can be varied by selecting the type of the gas. Examples of the gas include active gases and inert gases. The gas can be at least one selected from the group consisting of hydrogen, oxygen, silane, nitrogen, methane, hydrogen sulfide, and argon.

The plasma-treatment can include two stages: a first stage of bringing the intermediate product into contact with a first gas and a second stage of further bringing it into contact with a second gas. If the gas is a reactive gas, the intermediate product can be chemically converted into the final product. The plasma-treatment is useful in manufacturing the nanometer-size spherical particles (the final product) at extremely high yield, for example, a yield of 90% or more.

Nanometer-size spherical particles according to the present invention are useful in manufacturing high-efficiency elements or devices having various functions. In particular, these nanometer-size spherical particles are useful in manufacturing fine wires and through connections for electric or electronic devices; semiconductor photoelectric transducers, such as solar cells and charge-coupled devices, having high efficiency; reflective plates having high hardness; non-oil grease; luminescent materials having high brightness; and the like.

DESCRIPTION OF THE PREFERRED EMBODIMENTS

Apparatus for Producing Intermediate Product

Figure 1:
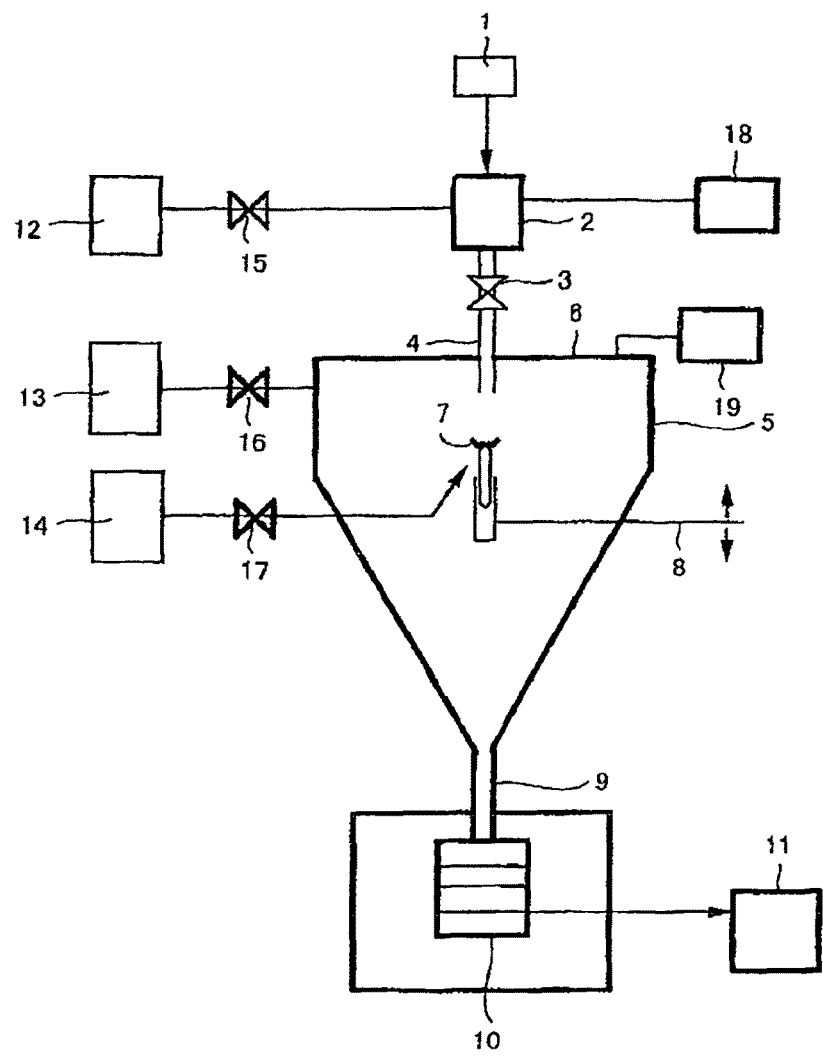
FIG. 1 is schematic view showing a configuration of a centrifugal granulation apparatus for producing an intermediate product of the present invention.

FIG. 1 is schematic view showing a configuration of a centrifugal granulation apparatus as disclosed in U.S. Pat. No. 6,808,568. This patent is owned by the inventors of the present invention. The centrifugal granulation apparatus is used for producing an intermediate product of the present invention, and carries out the first step of the present invention.

With reference to FIG. 1, the centrifugal granulation apparatus includes a starting-material supply cylinder 1; an electric oven 2, such as a high-frequency oven, for melting a starting material; a granulation chamber 5; a screening filter 10; and a particle recovery unit 11. The granulation chamber 5 includes a cylindrical section, a cone section located under the cylindrical section, and a lid 6 placed on the cylindrical section. A nozzle 4 extends through the center of the lid 6. A dish-shaped rotary disk 7 is disposed directly under the nozzle 4 and vertically moved with a support unit 8. A discharge pipe 9 for discharging the spherical particles is connected to the lower end of the cone section of the granulation chamber 5. The nozzle 4 connects the electric oven 2 to a high-frequency heater 3 and also connects the high-frequency heater 3 to the granulation chamber 5.

The electric oven 2 is supplied with a starting material from the starting-material supply cylinder 1 and melts the starting material. A first atmosphere gas, stored in a first gas tank 12, having a predetermined composition, is fed to an upper portion of the electric oven 2. A second atmosphere gas and a third atmosphere gas stored in a second gas tank 13 and a third gas tank 14, respectively, are fed to the granulation chamber 5.

The pressure in the electric oven 2 is controlled by using a first valve 15 and a first evacuation unit 18. The pressure in the granulation chamber 5 is controlled by using a second valve 16, a third valve 17, and a second evacuation unit 19. If the pressure in the electric oven 2 is maintained slightly higher than the atmospheric pressure and pressure in the granulation chamber 5 is maintained slightly lower than the atmospheric pressure, the difference in pressure allows the molten starting material in the electric oven 2 to be fed to the dish-shaped rotary disk 7 through the nozzle 4. The molten starting material is fed to the dish-shaped rotary disk 7 and atomized into fine droplets by the centrifugal force generated by the rotating dish-shaped rotary disk 7. The fine droplets are solidified into spherical particles by quenching. The spherical particles are fed to the screening filter 10 through the discharge pipe 9 and then screened therewith.

In the first step, the molten starting material is fed onto the dish-shaped rotary disk 7 in an inert gas such as argon and then atomized into fine droplets with centrifugal force and the fine droplets are brought into contact with the inert atmosphere such that the fine droplets are solidified into the spherical particles by quenching.

If the rotary body is shaped into a plane disk or cone, the centrifugal force applied to the molten metal varies depending on the portion of the rotary body where the molten metal is fed, and particle size distribution is broaden. In the present invention, the periphery of the dish-shaped rotary disk 7 has a wall portion to make a concaved portion at the center of the disc body, and therefore, the stable centrifugal force is applied to the molten starting material; hence, the dispersed fine droplets becomes even in the size. The fine droplets are then quenched in a mixture of the second and third gases to be solidified as spherical particles. The spherical particles are then collected at the screening filter 10.

The granulation of the molten metal has been investigated using an apparatus similar to the centrifugal granulation apparatus. The investigation has shown that droplets of the molten metal are solidified into fine particles having a composite structure by quenching and the fine particles are self-assembled such that the fine regions are isolated from each other with inclusions or cavities depending on the composition of the starting material and/or the type of the gases. The term "self-assembling" means that molten metal by itself forms a composite structure during atomization and solidification processes of the present invention.

As increasing the rotation speed of the dish-shaped rotary disk 7, the size of the spherical particles can be reduced. When the dish-shaped rotary disk 7 has a diameter of 35 mm and a depth of 5 mm, the rotational speed thereof can be 30,000 rpm or more in order to allow the spherical particles having an average size of 200 μm or less.

The second and third gases fed to the granulation chamber 5 can be maintained at room temperature. In order to efficiently quench the fine droplets formed from the molten starting material, the flow rates of the second and third gases can be controlled such that the atmosphere inside the granulation chamber 5 is maintained at 100° C. or less. The centrifugal granulation apparatus can be continuously operated for a long time.

Apparatus for Producing Final product

Figure 2:
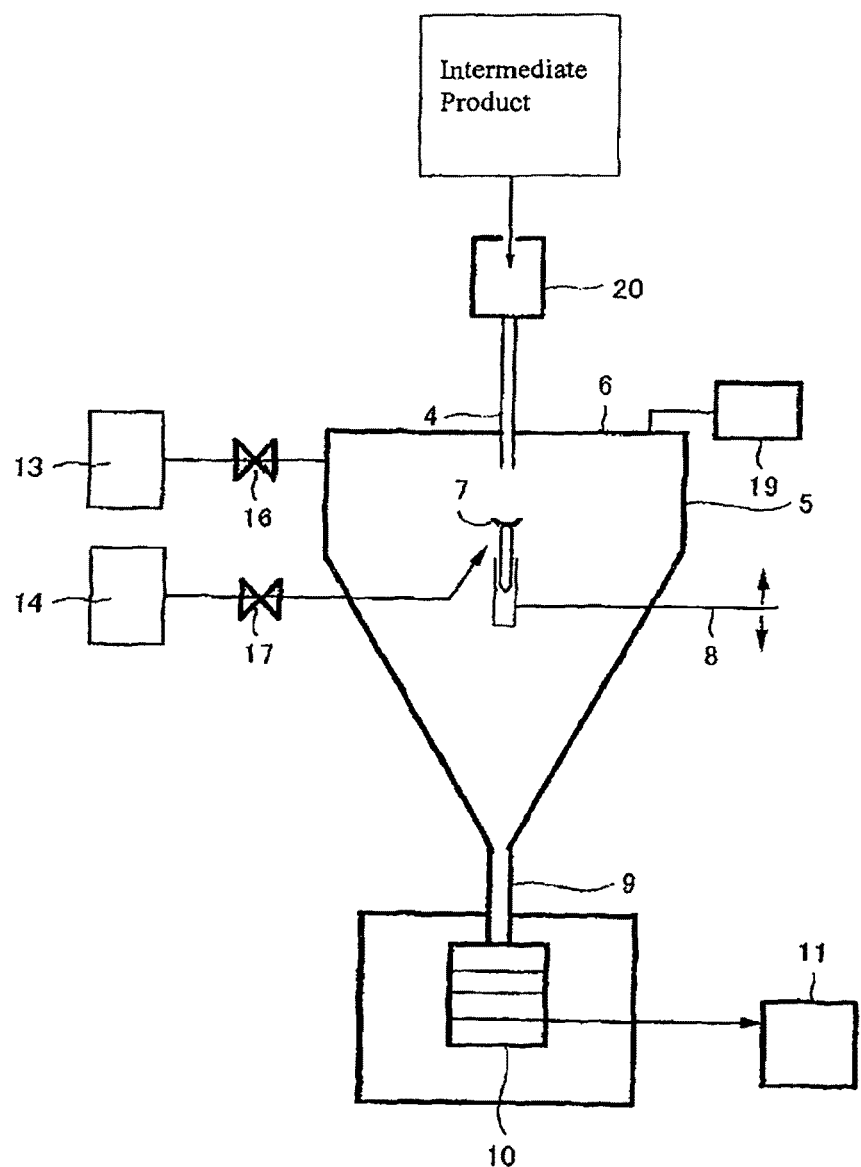
FIG. 2 is a schematic view showing a configuration of an apparatus for producing a final product of the present invention.

FIG. 2 shows an apparatus for producing a final product of the present invention, including nanometer-size spherical particles. The apparatus shown in FIG. 2 has substantially the same configuration as that of the centrifugal granulation apparatus shown in FIG. 1 except that this apparatus includes a plasma reaction unit 20 instead of the electric oven 2.

Figure 3:
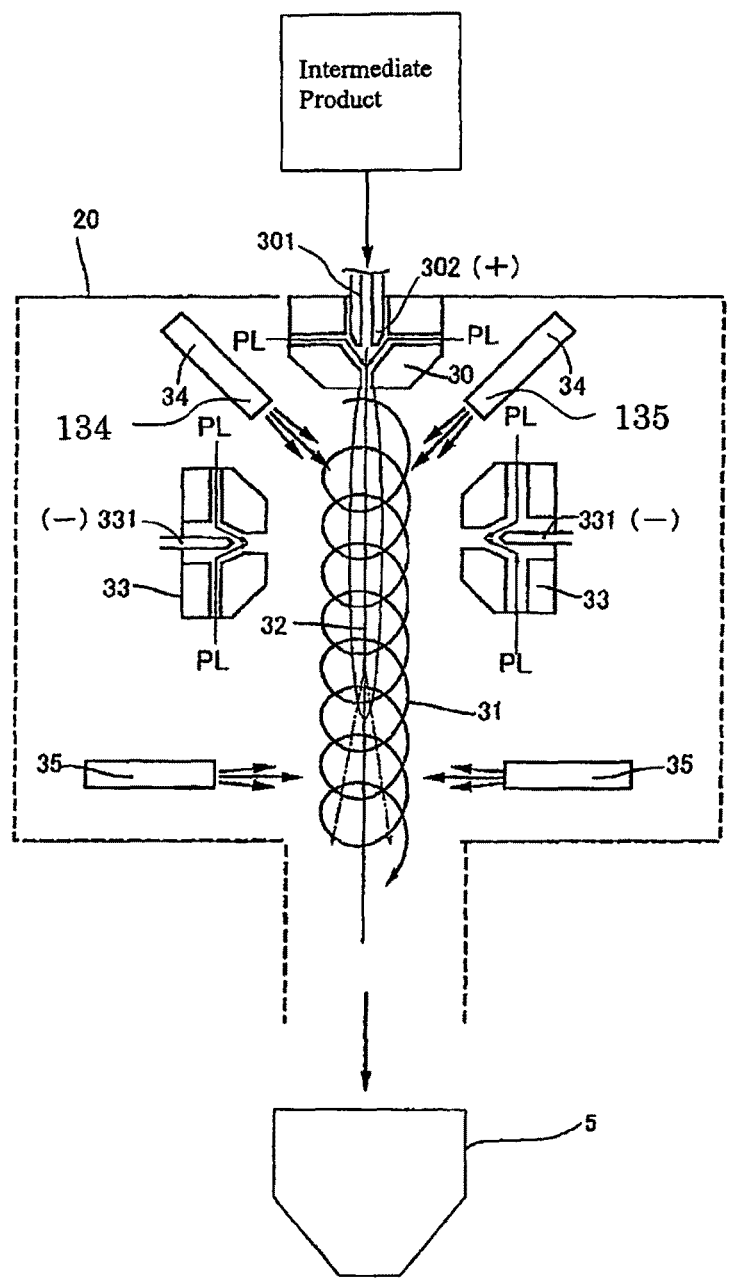
FIG. 3 is schematic view showing a configuration of a plasma reaction unit included in the apparatus shown in FIG. 2.
Figure 4:
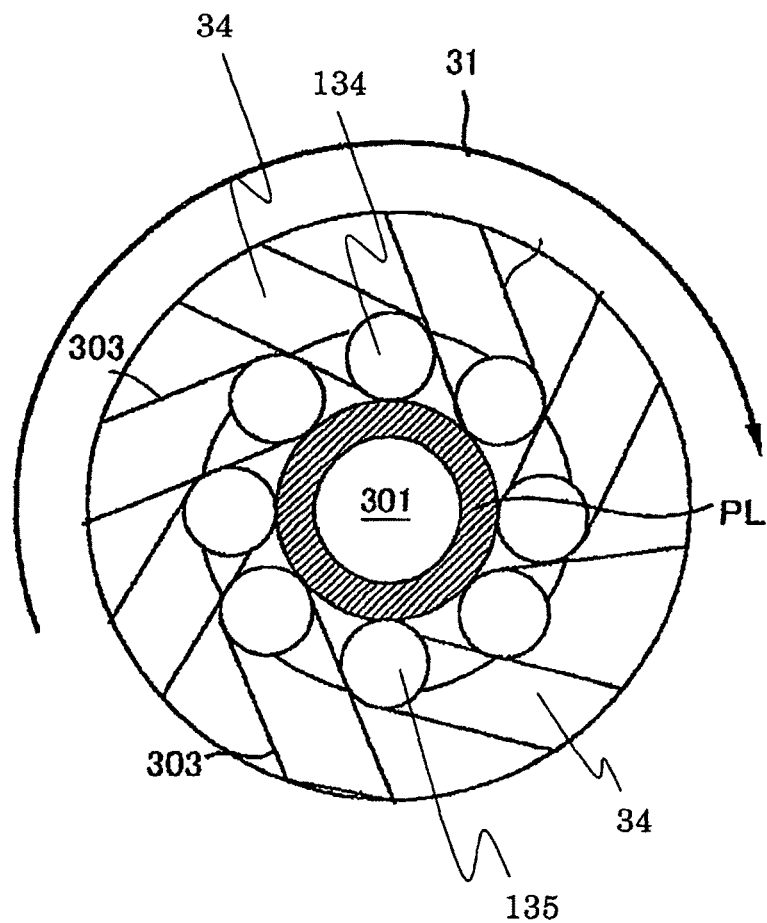
FIG. 4 is an enlarged view of a part of the plasma reaction unit shown in FIG. 3.

FIG. 3 is a schematic view showing a configuration of the plasma reaction unit 20. The plasma reaction unit 20 is used to bombard the intermediate products, obtained in the first step, with argon ions in a plasma swirl to from the spherical particles having a nanometer size as well as to bring the resulting spherical particles into contact with a gas component or vapor component to subject the spherical particles to plasma-enhanced crystallization. This converts the spherical particles into the fine spherical particles having a sphericity of 10% or less. With reference to FIG. 3, the plasma reaction unit 20 includes a principal torch 30, an auxiliary torch 33, a first reaction gas supply unit 34, and a second reaction gas supply unit 35.

The principal torch 30 includes a first plasma gas supply unit for supplying a plasma gas PL, a first-product supply unit 301 for supplying the intermediate product, and an cathode 302. The auxiliary torch 33 includes a second plasma gas supply unit for supplying the plasma gas PL and an anode 331. When plasma is generated between the cathode 302 and the cathode 331, flows of the plasma gas PL are discharged from the first and second plasma gas supply units and intersect with each other. Since the plasma gas PL is electrically conductive, a conductive path extending from the tip of the auxiliary torch 33 to the tip of the principal torch 30 is formed.

The intermediate product is fed to the first-product supply unit 301 and then discharged therefrom along a central axis 32. In this operation, an inert gas such as argon is discharged from the first reaction gas supply unit 34 simultaneously with the feed of the intermediate product. The inert gas flows along the central axis 32 and serves as a protective gas. Hence, the intermediate product is prevented from being scattered and therefore is treated at a probability close to 100%. As shown in FIG. 3 in an enlarged manner, the plasma gas PL forms a plasma gas flow 31, which travels around the central axis 32. The feed rate of the intermediate product can be 1 to 30 L/min.

After the intermediate product is subjected to a first plasma reaction as described above, the resulting intermediate product is subjected to a second plasma reaction with the second reaction gas supply unit 35. This promotes the plasma treatment to the intermediate product.

A gas used in this step can be a mixture of argon and at least one active gas selected from the group consisting of hydrogen, oxygen, silane, nitrogen, methane, and hydrogen sulfide. The content of the active gas in the gas can be 30% by volume or less. The feed rate of the reaction gas can be 1 to 30 L/min.

The resulting intermediate product is fed to a granulation chamber 5 and then subjected to granulation as described above, whereby the final product is obtained.

There is provided here a method for producing nanometer-size spherical particles, comprising:

a first step for providing an alcohol solution including an organic compound and/or a metal compound such as a metal oxide, a metal silicide, a metal nitride, metal carbide, and a metal sulfide; and a second step for producing final spherical particles, comprising:

subjecting the alcohol solution to an plasma swirling treatment to collide with argon ions so as to crash the intermediate spherical particles into final spherical particles in a second atmosphere, wherein the final spherical particles have a particle size of less than 1 μm having a sphericity of −10% to +10%. Namely, instead of the intermediate product obtained by the apparatus as shown in FIG. 1, the alcohol solution can be alternatively used. In this method, a metal compound such as a metal oxide, a metal silicide, an organic compound and/or a metal nitride, metal carbide, and a metal sulfide is dissolved or dispersed in an alcohol. Thereby obtained alcohol solution can be used to be supplied to the apparatus as shown in FIG. 2. The alcohol can include methyl alcohol and ethyl alcohol. The organic compound can include silane. The metal organic compound can include ruthenium compounds such as tris ruthenium ($Ru(C_{11}H_{19}O_2)_3$) and bis ruthenium ($Ru(C_5H_4C_2H_5)_2$); and silane. When the alcohol solution is treated by the apparatus as shown in FIG. 2, a hydrogen gas is supplied through the first and second reaction gas supply units 34, 35, shown in FIG. 3. Methane gas or ethane gas can be also used. The alcohol solution is supplied through the supply unit by carbon dioxide gas. As a result, a final product of nanometer-size spherical particles can be obtained which include carbon in the form of diamond, graphite, amorphous carbon, or carbon nano-tube. It is believed that carbon is obtained by a reduction reaction of the solution including an alcohol. When the metal compound is included in the alcohol solution, the final product of nanometer-size spherical particles can include a composite structure including carbon and the metal compound. In this method, the particle size of the final product can be 1 μm or less. The sphericity of the final product can be between −10% and +10%.

EXAMPLES

Example 1

(a) Production of Intermediate Product

The centrifugal granulation apparatus as shown in FIG. 1 was used to produce an intermediate product including spherical particles. A starting material used was an alloy containing indium (In), tin (Sn), gallium (Ga), and bismuth (Bi).

The alloy was fed to an electric oven 2, and molten. The molten alloy passed through a nozzle 4 to be fed to the granulation chamber 5. In the granulation chamber 5, the molten alloy was fed onto a dish-shaped rotary disk 7 and then atomized into droplets by the centrifugal force created by the high-speed rotation of the dish-shaped rotary disk 7. The droplets were quenched. Thereby, spherical particles were obtained. In this step, argon was used and the pressure in the granulation chamber 5 was about 0.3 MPa. The dish-shaped rotary disk 7 had a diameter of about 35 mm and a depth of about 5 mm.

Figure 5:
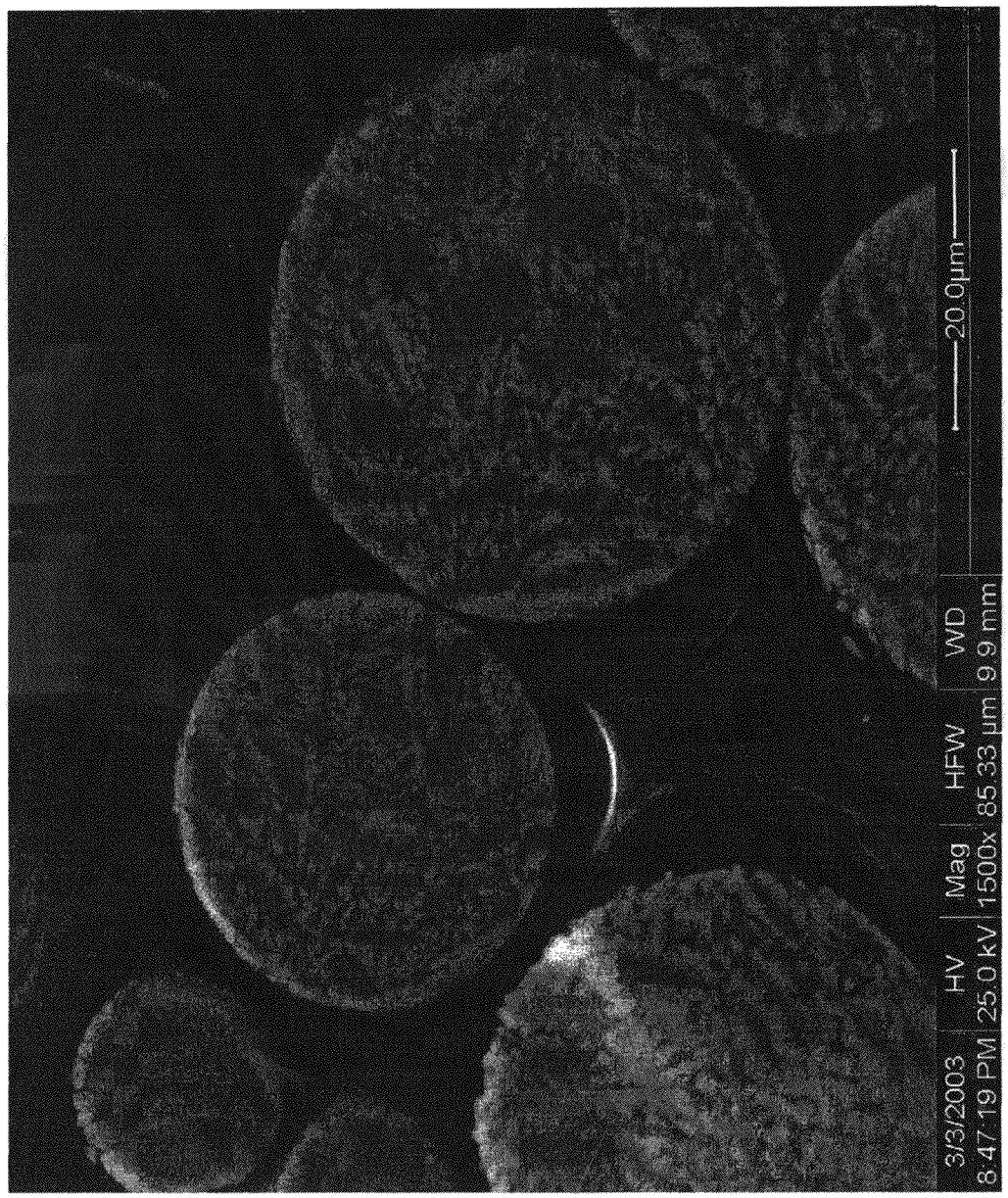
FIG. 5 is an image of a intermediate product, shown in cross section, produced in Example 1, the image being taken with a scanning electron microscope (SEM) and being hereinafter referred to as a SEM image.

The intermediate product had an averaged particle size of about 15 μm. FIG. 5 is a SEM image of the intermediate'product taken in the cross section. FIG. 5 illustrates that amorphous metal regions are homogenously mixed. This confirms that the spherical particles of the intermediate product have a composite structure.

(b) Production of Final Product

A final product was produced in such a manner that the intermediate product was treated in the apparatus shown in FIG. 2. Argon was used as a gas.

The final product included spherical particles having a size of 100 to 200 nm, having a sphericity of about −1% to +1%. The particles are made of an alloy including In, Sn, Ga, and Bi. The content of In in the alloy, that of Sn, that of Ga, and that of Bi were about 6.17%, 67.72%, 0.78%, and 25.33%, respectively, on the weight basis.

Figure 6:
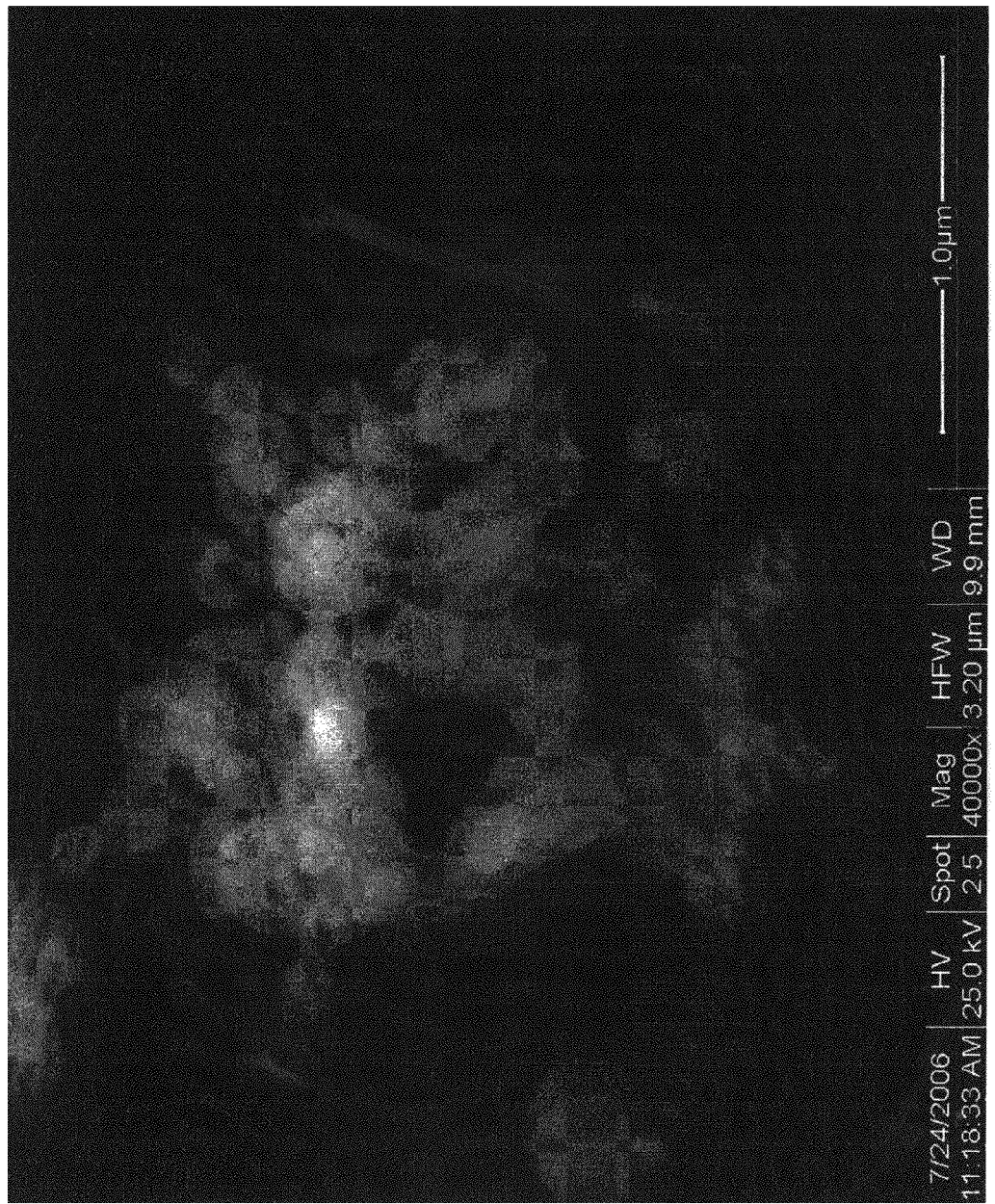
FIG. 6 is a SEM image of a final product produced in Example 1.
Figure 7:
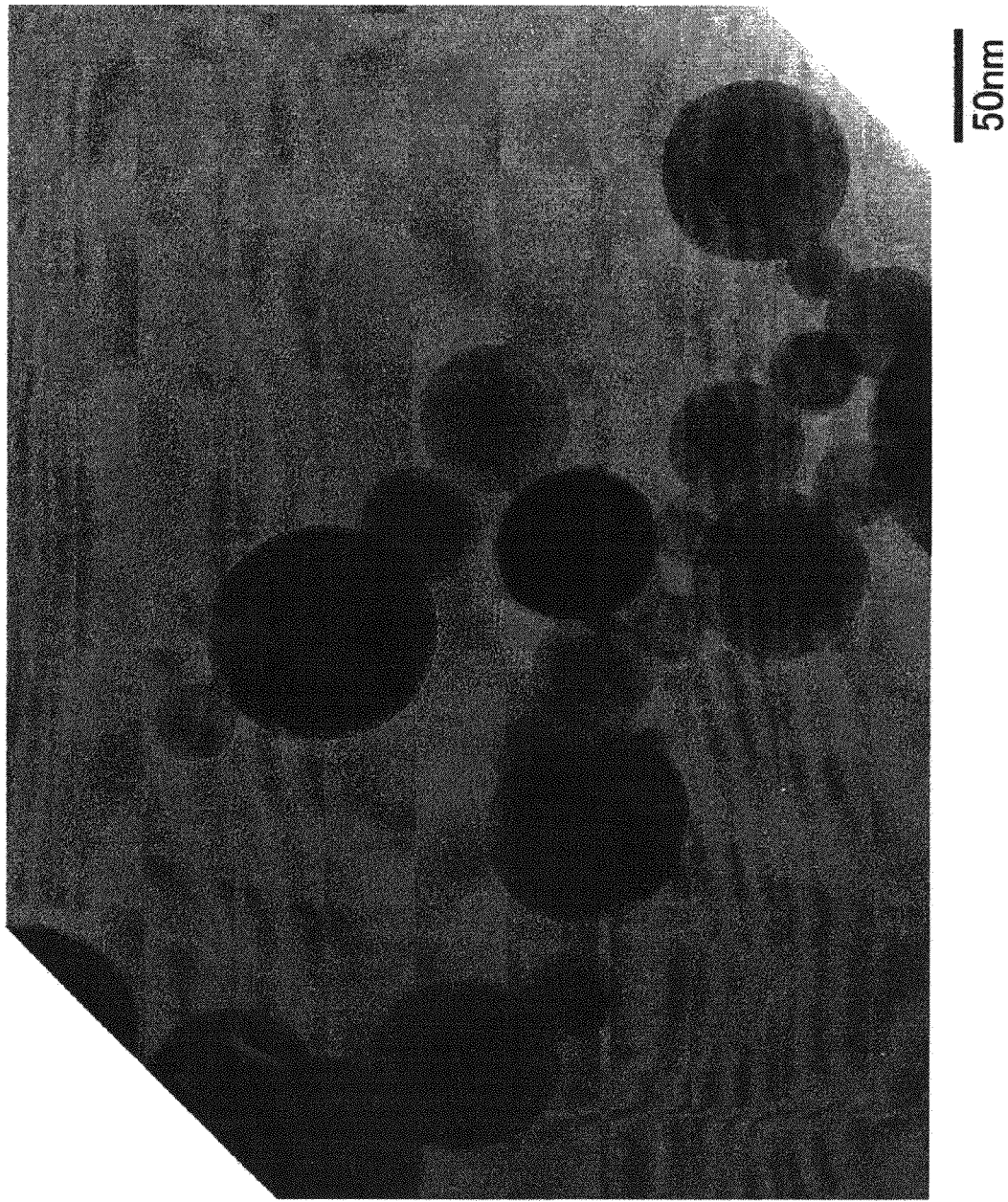
FIG. 7 is an image of a final product produced in Example 2, the image being taken with a transmission electron microscope (TEM) and being hereinafter referred to as a TEM image.
Figure 8:
FIG. 8 is a TEM image of the final product, shown in cross section, produced in Example 2.

FIG. 6 is a SEM image of the final product. FIG. 6 illustrates that the fine spherical particles of the final product has a spherical shape.

The analysis by EDX showed that the composition of the intermediate product was substantially the same as the final product. The final product was not a compound.

By analyzing the particle size distribution of the final product, it was found that the final product has a target particle size of less than 1 μM.

The final product is suitable for use in fine wires, through connections, and other components for electric devices as described below.

The final product meets strict requirements for manufacturing fine wires for semiconductor devices. A material made of the final product has a bonding strength at least two times greater than that of conventional materials and endures a heat sink test for 2,000 hours. The material is at least four times superior in resistance to time-dependent deterioration as compared to the conventional materials. The material is useful in preventing migration. The material of the present invention can form wiring line having a width of 5 μm or less or via-holes having a diameter of 5 μm or less, because the particles have a size of 200 nm or less.

Example 2

(a) Production of Intermediate Product

An intermediate product was prepared in substantially the same manner as that described in Example 1 except that a starting material used was silicon (Si) with a purity of about 99.999999999%.

The intermediate product included spherical Si particles having a single-crystalline structure and had an average size of about 15 μm.

(b) Production of Final Product

A final product was produced in such a manner that the intermediate product was treated by the apparatus shown in FIG. 2. Argon was used as a gas.

The final product included fine spherical particles mostly having a size of 100 nm or less and a sphericity of about −1% to +1%. The first and final products were made of Si.

Figure 10:
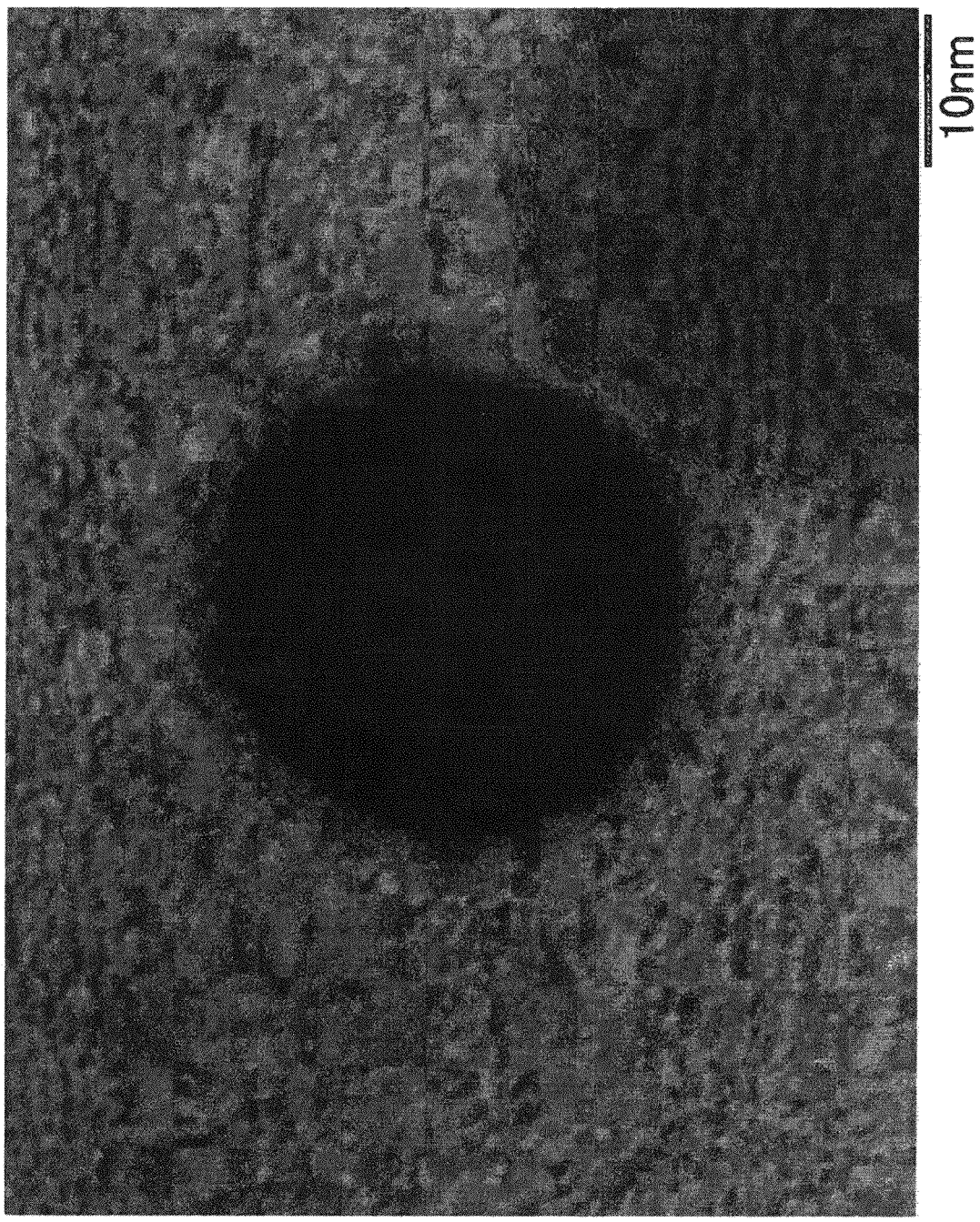
FIG. 10 is a TEM image of a final product produced in Example 4.

FIG. 10 is a TEM image of the final product. FIG. 10 illustrates that the fine spherical particles of the final product had substantially complete spherical shape.

Figure 11:
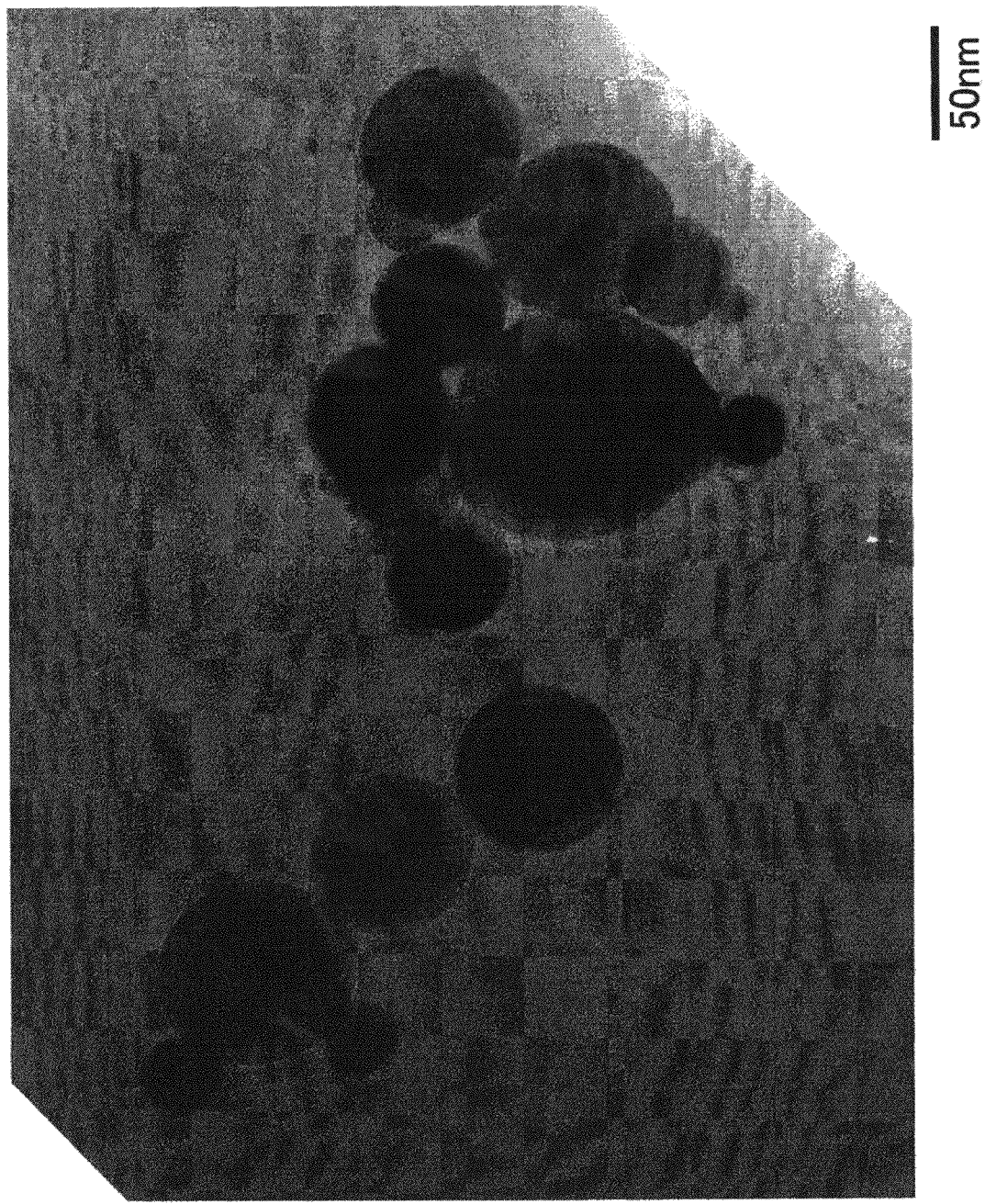
FIG. 11 is a TEM image of a final product produced in Example 5.

FIG. 11 is a TEM image of the final product shown in cross section. This TEM image illustrates that the fine spherical particles of the final product had no composite structure but a single-crystalline structure.

The single-crystalline structure of the fine spherical particles was confirmed in such a manner that the lattice spacing between the (111) planes of a standard Si sample was used as a reference. In particular, lattice images of the (111) planes of the standard Si sample were calculated for magnification. Similar portions of the sample displayed at 200,000 times magnification were corrected for magnification on the basis of actual magnification. Obtained values were multiplied by three, eight, ten (120,000 times), or ten (290,000 times) that were magnifications of photographs, whereby the magnification of the sample shown in each photograph was determined. In this operation, the lattice spacing between the Si (111) planes was as listed in the JCPDS card. The technique using the standard Si sample was used to determine the crystal structure of particles produced in subsequent examples.

The TEM image illustrates that the fine spherical particles of the final product had clear lattice stripes. The distance between the lattice stripes was 0.30 nm and therefore corresponded to the lattice spacing between the Si (111) planes. This shows that the fine spherical particles had a single-crystalline structure.

The analysis by EDX showed that the composition of the intermediate product is the same as the final product. The final product contained no compound.

By analyzing the particle size distribution of the final product, it was found that the final product can be produced having a particle size of 100 nm or less.

The final product is useful in manufacturing semiconductor photoelectric transducers, such as solar cells, having extremely high efficiency.

This is because nanometer-size single-crystalline spherical Si particles having a size of 20 nm or less can be readily processed into n-type or p-type semiconductor particles. A solar cell having 500-nm layers, each disposed between transparent electrodes, containing the n-type or p-type semiconductor particles, shows a photoelectric conversion efficiency at least two times greater than that of conventional solar cells.

Example 3

(a) Production of Intermediate Product

An intermediate product was prepared in substantially the same manner as that described in Example 1 except that a starting material was Si with a purity of about 99.999999999%. The intermediate product included spherical Si particles having a single-crystalline structure and had an average size of about 15 μm.

(b) Production of Final Product

A final product was produced using the intermediate product and the apparatus shown in FIG. 2. A gas used was oxygen. The final product included fine spherical silicon dioxide ($SiO_2$) particles mostly having a size of 100 nm or less and a sphericity of about −1% to +1%. The intermediate product contained Si and the final product contained $SiO_2$.

Figure 9:
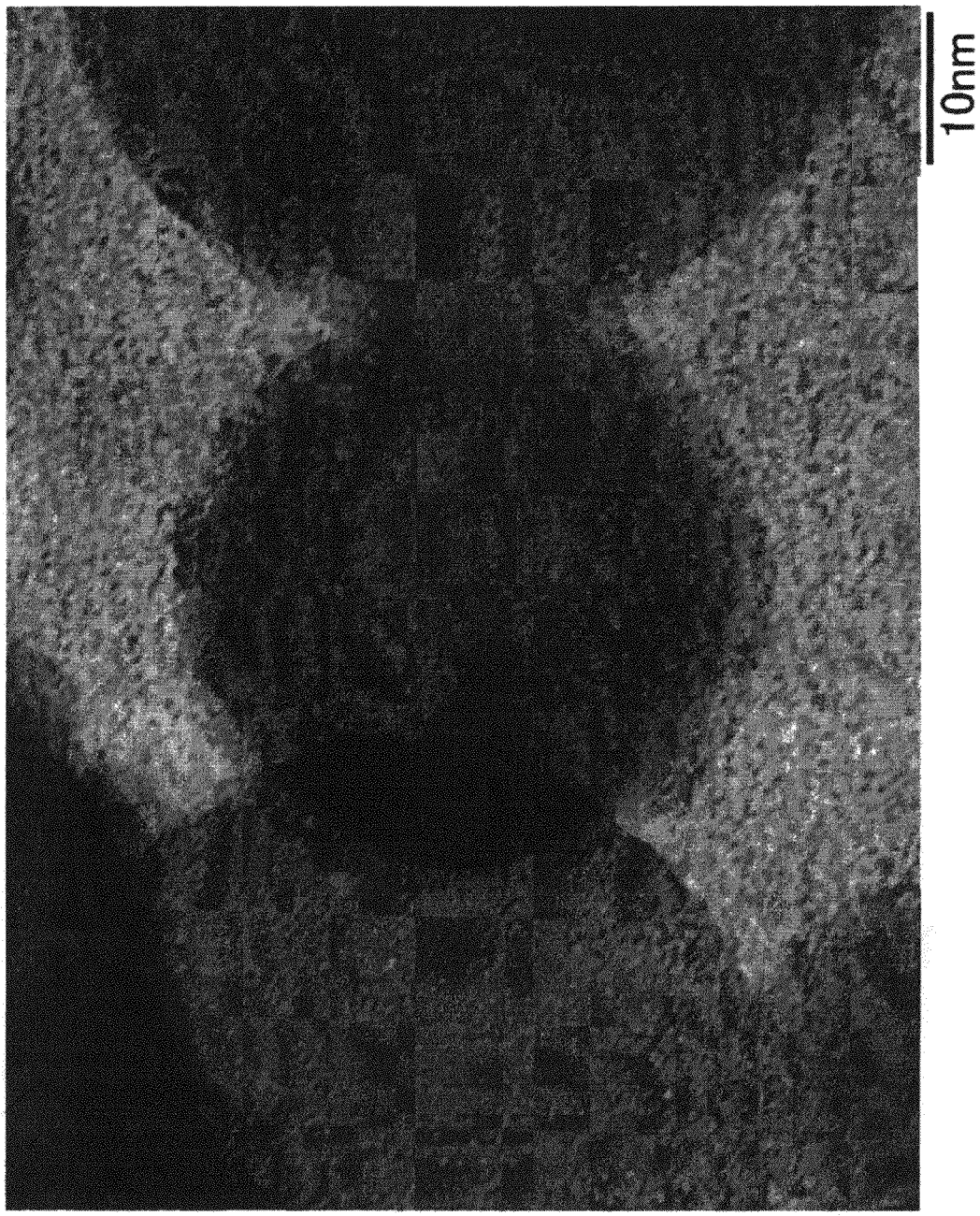
FIG. 9 is a TEM image of a final product produced in Example 3.

FIG. 9 is a TEM image of the final product. FIG. 9 illustrates that the $SiO_2$ particles of the final product had substantially complete spherical shape. A particle centered in FIG. 9 has a grid-shaped portion indicated by Arrow A and an unclear portion. The grid-shaped portion corresponds to a polycrystalline region and the unclear portion corresponds to an amorphous oxide region. This confirms the presence of a composite structure. Furthermore, FIG. 9 illustrates that the $SiO_2$ particles of the final product had a size of 100 nm or less. The particle size distribution of the final product of this example is substantially the same as that of the final product of Example 2.

The analysis by EDX showed that Si in the intermediate product was oxidized into $SiO_2$ by the oxygen gas.

The final product of Example 3 is useful in manufacturing semiconductor photoelectric transducers, such as charge-coupled devices (CCDs), having high efficiency.

The nanometer-size single-crystalline spherical $SiO_2$ particles having a size of 20 nm or less are used to form a $SiO_2$ layer between n-type or p-type semiconductor layers and both ends of the $SiO_2$ layer are connected to electrodes. The $SiO_2$ layer emits light with high efficiency. These particles are useful in manufacturing novel light-emitting devices.

Example 4

(a) Production of Intermediate Product

An intermediate product was prepared in substantially the same manner as that described in Example 1 except that a starting material was Si of a purity of about 99.999999999%. The intermediate product included spherical Si particles having a single-crystalline structure and had an average size of about 15 μm.

(b) Production of Final Product

A final product was produced by using the intermediate product and the apparatus shown in FIG. 2. A gas used was methane. The final product included fine spherical silicon carbide (SiC) particles having a size of 100 nm or less and a sphericity of about −1% to +1%. The Si particles of the intermediate product were converted into the SiC particles of the final product.

FIG. 10 is a TEM image of the final product. A particle shown in FIG. 10 has substantially a complete spherical shape. The particle has an blur outer portion, which corresponds to a polycrystalline carbide region. This confirms that the particle had a composite structure. Furthermore, FIG. 10 illustrates that the particle had a size of 100 nm or less. The particle size distribution of the final product of this example was substantially the same as that of the final product of Example 2.

The analysis by EDX showed that Si in the intermediate product was converted into SiC by the methane gas.

The final product of this example is useful in manufacturing reflective plates having high hardness.

The spherical SiC particles having a size of about 100 nm, high hardness, and a composite structure are served as bearing balls and a mixture of the SiC particles and spherical BN particles having a size of about 100 nm, low hardness, and a composite structure is served as retainers for retaining bearings. This can produce an extreme-pressure sliding section of machines that include the bearing balls and the retainers with oil-free.

Example 5

(a) Production of Intermediate Product

An intermediate product was prepared in substantially the same manner as that described in Example 1 except that a starting material used was boron (B). The intermediate product included spherical boron particles having a composite structure and had an average size of about 15 μm.

(b) Production of Final Product

A final product was produced using the intermediate product and the apparatus shown in FIG. 2. A gas used was nitrogen. The final product included fine spherical boron nitride (BN) particles having a size of 100 nm or less and a sphericity of about −1% to +1%. The intermediate product contained B and the final product contained BN.

FIG. 11 is a TEM image of the final product. FIG. 11 illustrates that the final product had substantially complete spherical shape and a size of 100 nm or less. The particle size distribution of the final product of this example is substantially the same as that of the final product of Example 2.

The analysis by EDX showed the conversion into a nitride compound by the nitrogen gas.

The final product of this example is useful in producing non-oil grease for the same reason as that described in Example 4.

Example 6

(a) Production of Intermediate Product

An intermediate product was prepared in substantially the same manner as that described in Example 1 except that a gas used was a gas mixture of argon and oxygen and a starting material used was an alloy including oxygen (O), magnesium (Mg), aluminum (Al), barium (Ba), europium (Eu) and zinc (Zn). The intermediate product included spherical alloy particles having a composite structure and had an average size of about 15 μm.

(b) Production of Final Product

A final product was produced using the intermediate product and the apparatus shown in FIG. 3. A reaction gas used was a gas mixture of gaseous sulfur (S), argon, and 3% oxygen. The final product included fine spherical particles having a size of 100 nm or less and a sphericity of about −1% to +1%.

The intermediate product contained O, Mg, Al, Ba, Eu, and Zn. The content of O in the intermediate product was 21.62%, that of Mg was 4.59%, that of Al was 42.48%, that of Ba was 21.04%, that of Eu was 2.14%, and that of Zn was 8.12% on the weight basis.

The final product contained O, Mg, Al, Ba, Eu, Zn, and sulfur (S). The content of O in the intermediate product was 16.09%, that of Mg was 3.68%, that of Al was 29.98%, that of Ba was 11.57%, that of Eu was 1.08%, that of Zn was 30.68%, and that of S was 6.93% on the weight basis. This shows that the intermediate product was sulfurized.

Figure 12:
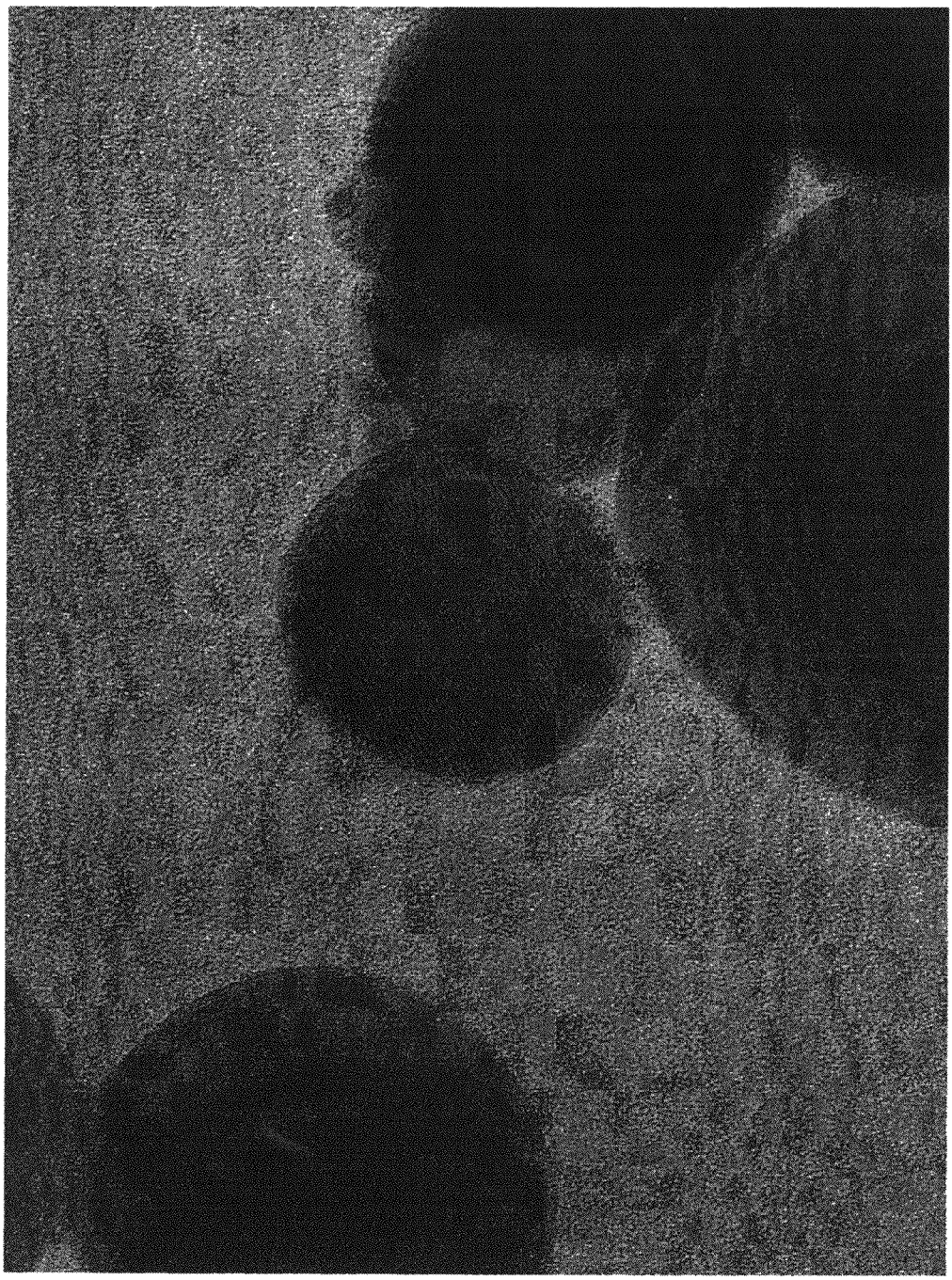
FIG. 12 is a TEM image of a final product produced in Example 6.

FIG. 12 is a TEM image of the final product. FIG. 12 illustrates that the particles of the final product have substantially a complete spherical shape and a particle size of 100 nm or less. The particles of the final product have a composite structure, which was confirmed in the same manner as that described in Example 2. The particle size distribution of the final product of this example is substantially the same as that of the final product of Example 2.

The analysis by EDX showed that the intermediate product has been oxidized, and that the final product has been sulfurized.

The final product of this example is useful in producing luminescent materials having high brightness.

The nanometer-size spherical particles, containing a rare-earth element oxide/sulfide, serve as phosphor materials having a high luminance. Therefore, these spherical particles are useful in manufacturing mercury-free lighting equipment which has brightness ten times greater than that of conventional one. Instead of mercury-ultraviolet ray excitation, a nitrogen-ultraviolet ray excitation can be possible.

Comparative Example 1

Si pieces were not subjected to the device as shown in FIG. 1. The Si pieces having a Si content of about 99.999999999% and a size of 15 μm were processed with the apparatus shown in FIG. 2. A gas used was argon. The Si pieces had no homogenous crystalline structure in contrast to an intermediate product of the present invention. Thereby obtained final product included Si particles, but the shape of the particle were irregular. The yield of the particles having a size of less than 100 nm was 50%.

Figure 13:
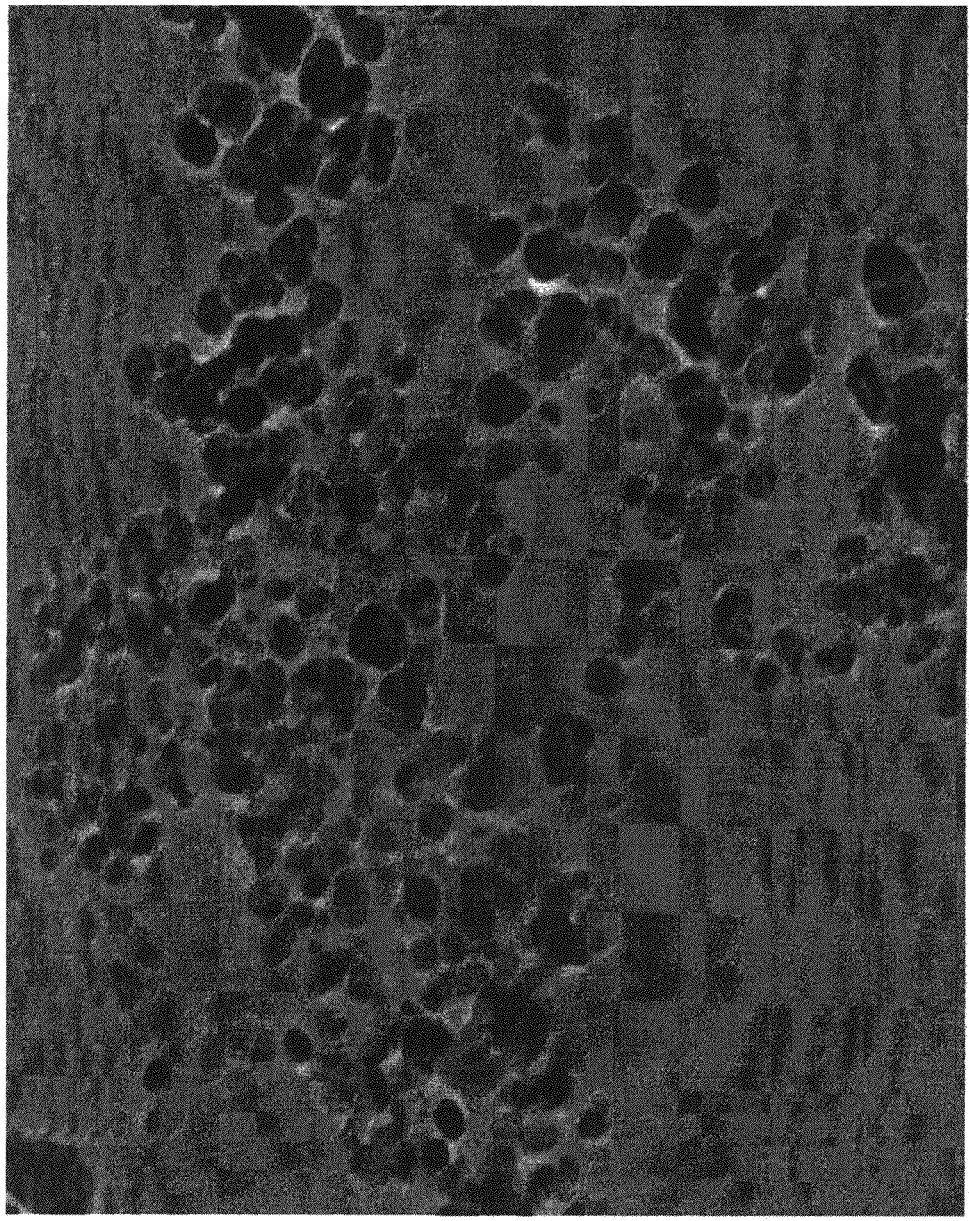
FIG. 13 is a TEM image of a final product produced in Comparative Example 1.

FIG. 13 is a TEM image of the final product. FIG. 13 illustrates that the Si particles of the final product had an irregular shape and a sphericity of 30% or more. This confirms that the Si particles are not spherical.

Analysis was made in view of the particle size distribution of the final product. A histogram showed that the particle size distribution had two peaks: a peak ranging from 200 to 400 nm and a peak ranging from 40 to 150 nm. When the desired particle size of the particle was defined as 100 nm or less, the yield of the particles was seriously low.

Comparative Example 2

Si pieces having a Si content of about 99.999999999% and a size of 30 μm were processed by the method disclosed in Japanese Unexamined Patent Publication No. 2005-320195. Thereby obtained final product included Si particles having an irregular shape.

Figure 14:
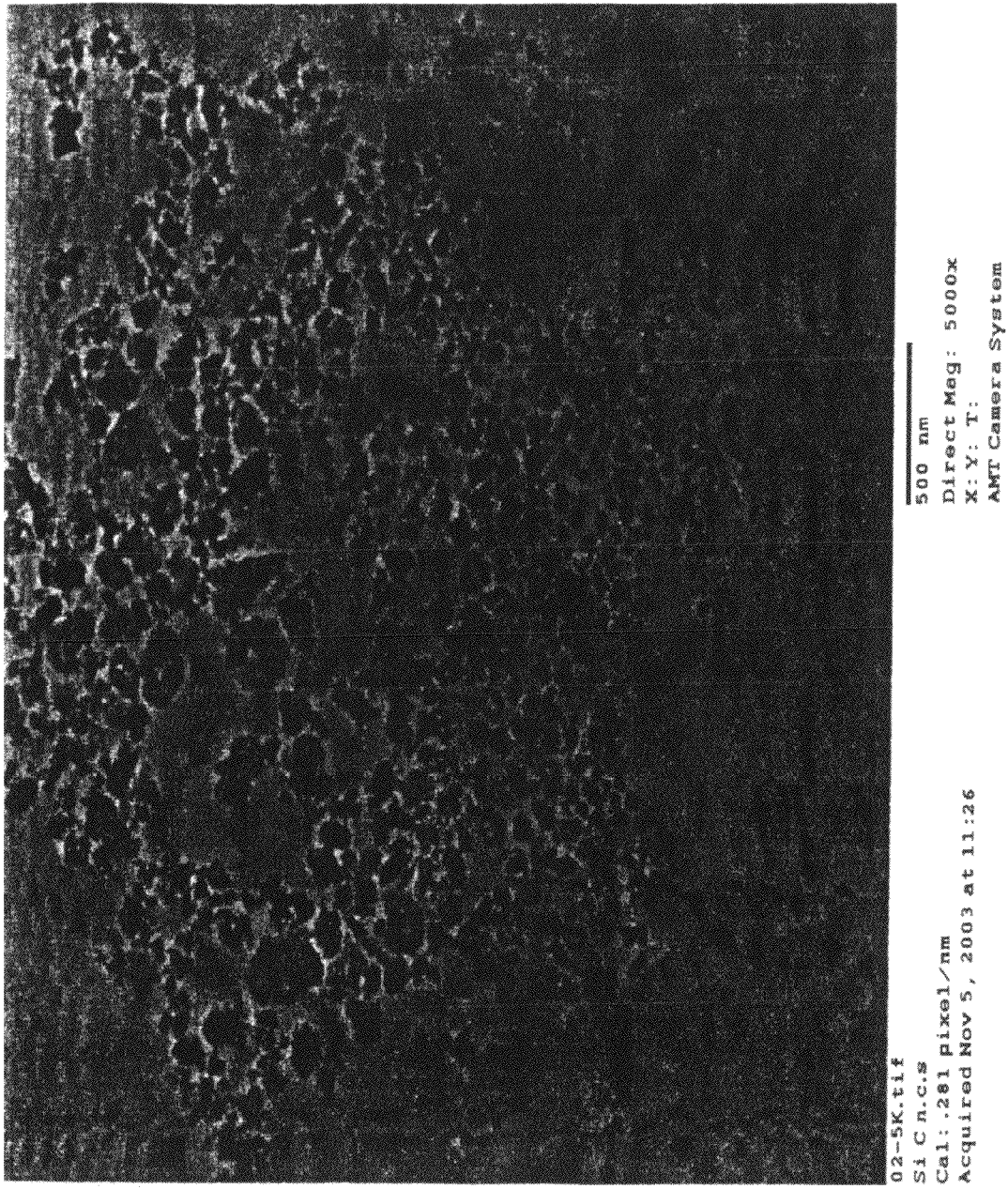
FIG. 14 is a TEM image of a final product produced in Comparative Example 2.

FIG. 14 is a TEM image of the final product, showing that the Si particles have no spherical shape but a polyhedral shape.

Analysis was made in view of the particle size distribution of the final product. A histogram showed that the particle size distribution has two peaks: a peak ranging from 4,000 to 15,000 nm and a peak ranging from 40 to 3,000 nm. When the desired particle size of the particle was defined as 100 nm or less, the yield of particles was seriously low.

Comparative Example 3

Si pieces having a Si content of about 99.999999999% and a size of 30 μm were processed by the method disclosed in Japanese Unexamined Patent Publication No. 2005-320195. Thereby obtained final product included Si particles.

Figure 15:
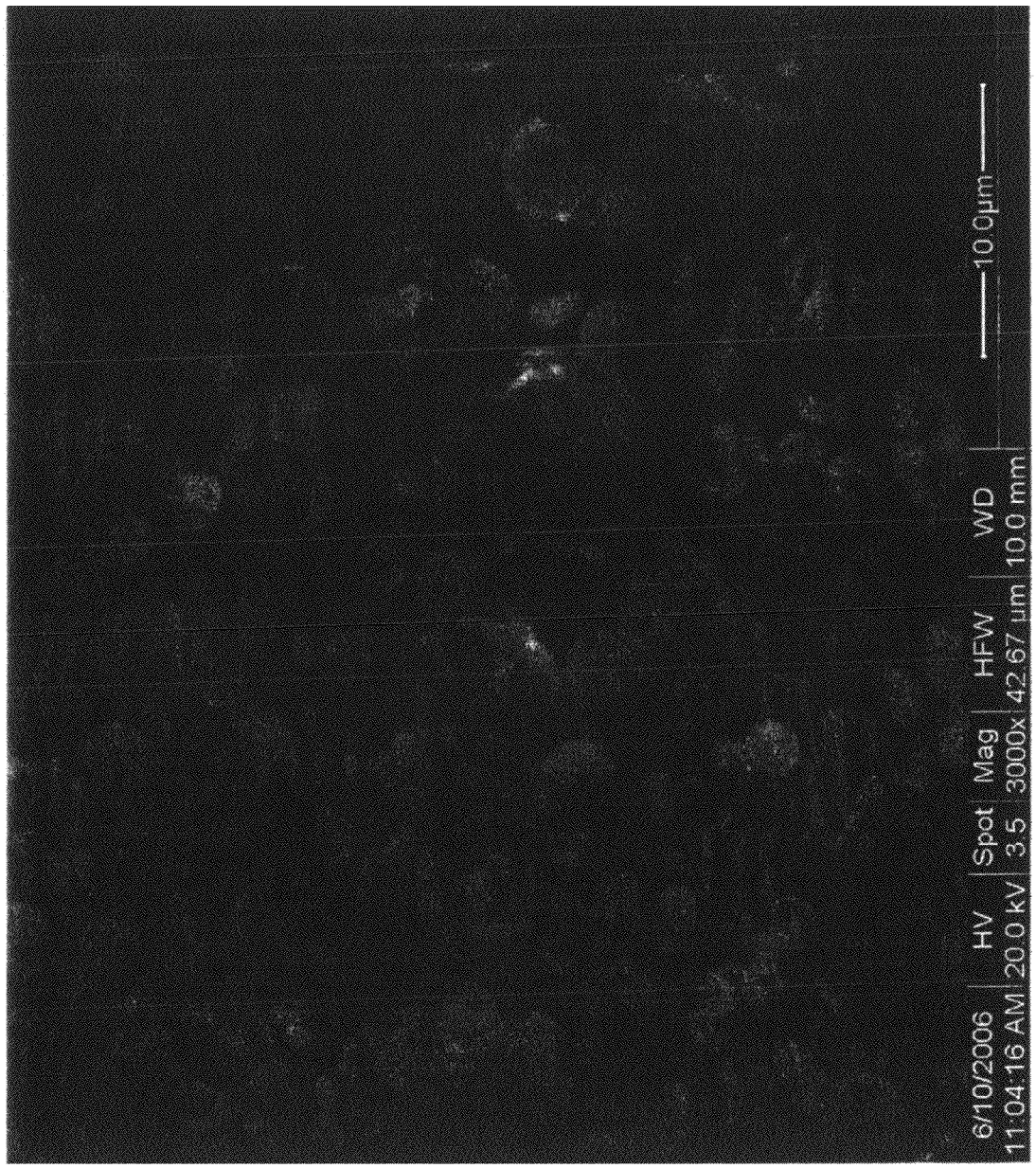
FIG. 15 is a SEM image of a final product produced in Comparative Example 3.

FIG. 15 is a SEM image of the final product. FIG. 15 illustrates that the Si particles have a wide size range. The Si particles had a size ranging from several hundred nanometers to several ten micrometers and the shape of the Si particles was not spherical.

Analysis was made in view of the particle size distribution of the final product. A histogram showed that the particle size distribution had two peaks: a peak ranging from 4 to 30 μM and a peak ranging from 40 to 3,000 nm. When the desired particle size of the particle was defined as 100 nm or less, the yield of particles was seriously low.

Comparative Example 4

Si pieces having a Si content of about 99.999999999% and a size of 30 μm were processed by a vapor phase process. Thereby obtained final product included Si particles. The Si particles had an irregular shape.

Figure 16:
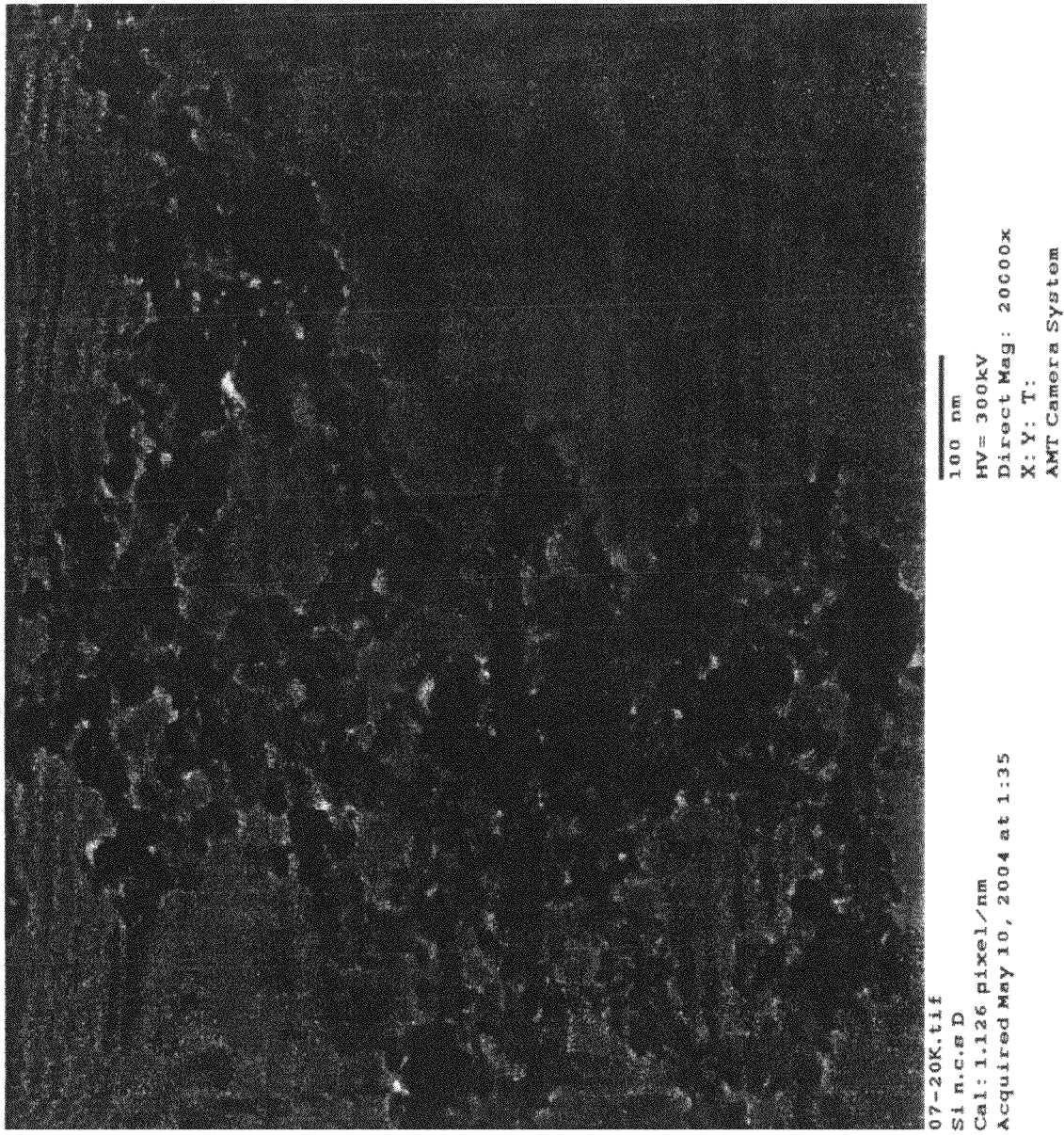
FIG. 16 is a TEM image of a final product produced in Comparative Example 4.

FIG. 16 is a TEM image of the final product. FIG. 16 illustrates that the Si particles had an irregular shape.

Analysis was made in view of the particle size distribution of the final product. A histogram showed that the particle size distribution had a peak centered at about 180 nm. When the desired particle size of the particle was defined as 100 nm or less, the yield of the particles was significantly low.

Comparative Example 5

Si pieces having a Si content of about 99.999999999% and a size of 30 μm were processed by a conventional laser ablation process.

Thereby obtained final product included Si particles having an irregular shape and a sphericity of about 50%.

Figure 17:
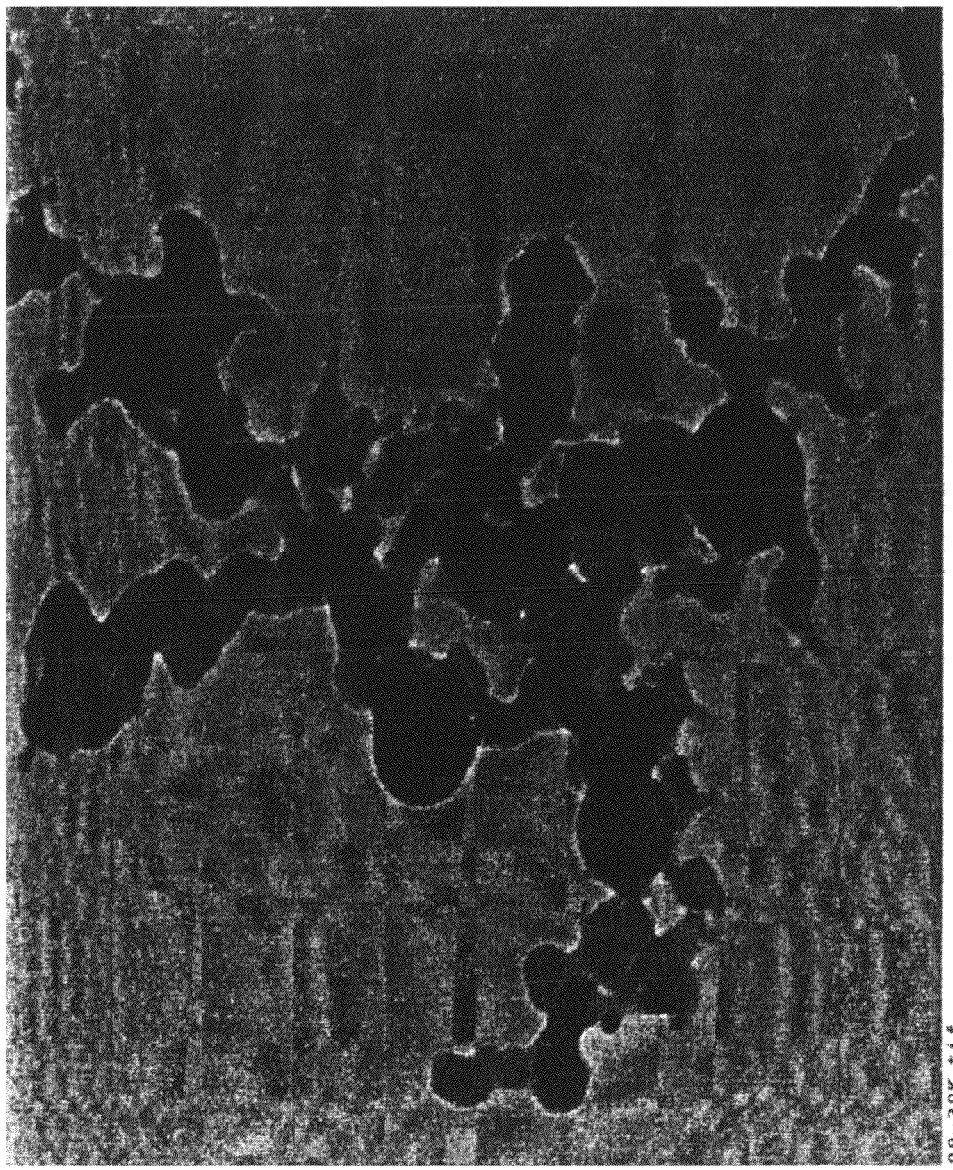
FIG. 17 is a TEM image of a final product produced in Comparative Example 5.

FIG. 17 is a TEM image of the final product. FIG. 17 illustrates that the Si particles had an irregular shape.

Analysis was made in view of the particle size distribution of the final product. A histogram showed that the particle size distribution had two peaks: a peak ranging from 3 to 14 μm and a peak ranging from 40 to 3,000 nm. When the desired particle size of the particle was defined as 100 nm or less, the yield of particles was significantly low.

Comparative Example 6

Si pieces having a Si content of about 99.999999999% and a size of 30 μm were processed by an anodic oxidation process. Thereby obtained final product included Si particles having an irregular shape. Since the shape of the Si particles was significantly irregular, the sphericity of the Si particles could not be measured.

Figure 18:
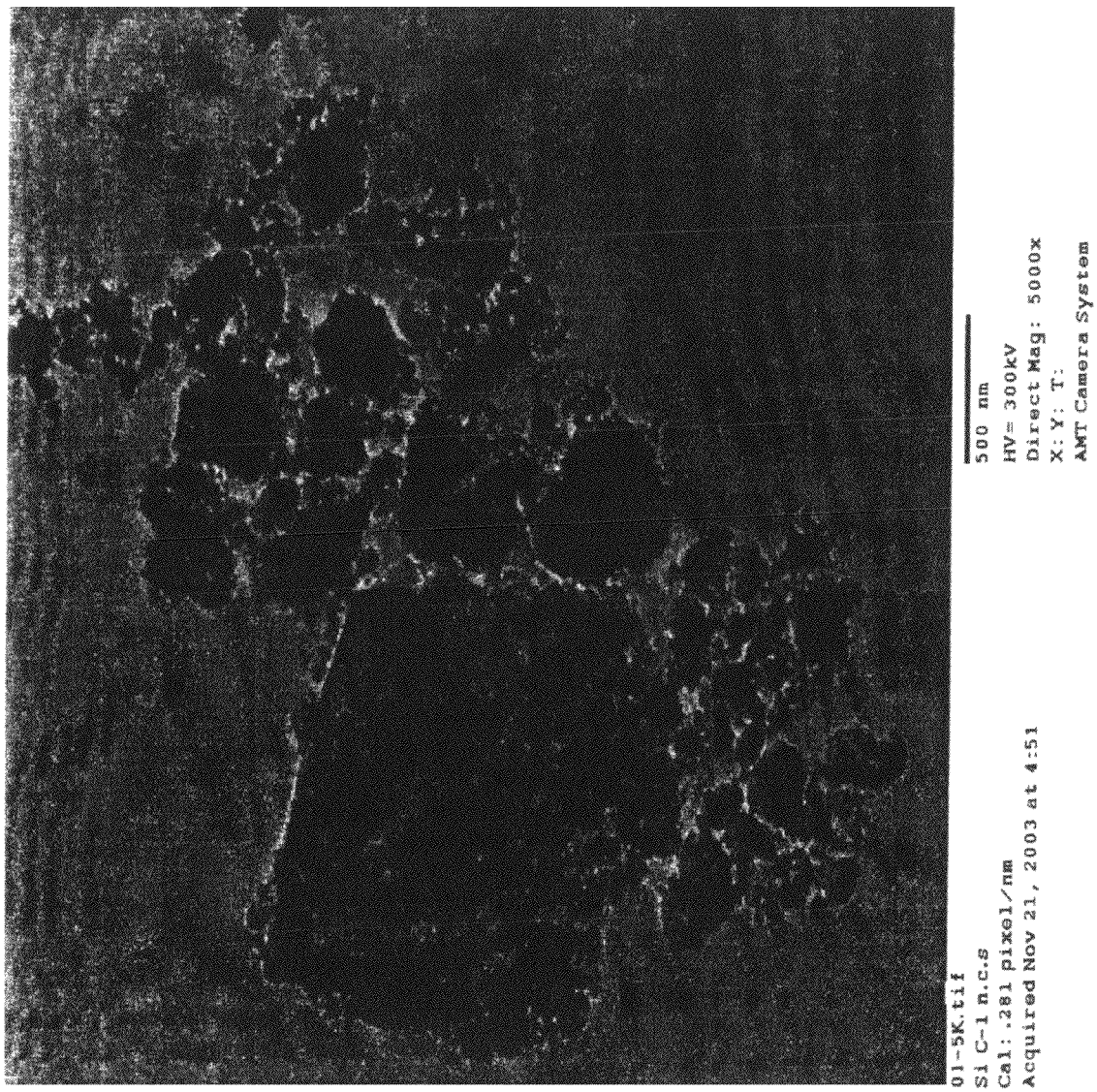
FIG. 18 is a TEM image of a final product produced in Comparative Example 6.

FIG. 18 is a TEM image of the final product. FIG. 18 illustrates that the Si particles had an irregular shape.

Analysis was made in view of the particle size distribution of the final product. A histogram showed that the particle size distribution had a peak centered at about 180 nm. When the desired particle size of the particle was defined as 100 nm or less, the yield of particles was significantly low.

Table 1 summarizes the characteristics of Examples 1 to 6 and Comparative Examples 1 to 6.

TABLE 1

|  | Shape | Sphericity | Percentage of target-sized particles | Producibility |
|---|---|---|---|---|
| Example 1 | Spherical | −1% to +1% | 80% or more | Producible |
| Example 2 | Spherical | −1% to +1% | 70% or more | Producible |
| Example 3 | Spherical | −1% to +1% | 70% or more | Producible |
| Example 4 | Spherical | −1% to +1% | 70% or more | Producible |
| Example 5 | Spherical | −1% to +1% | 70% or more | Producible |
| Example 6 | Spherical | −1% to +1% | 70% or more | Producible |
| Comparative Example 1 | Spherical | 30% or more | 50% or less | Producible |
| Comparative Example 2 | Irregular | Not measurable | 30% or less | less producible |
| Comparative Example 3 | Irregular | Not measurable | 20% or less | less producible |
| Comparative Example 4 | Irregular | Not measurable | 30% or less | less producible |
| Comparative Example 5 | Irregular | Not measurable | 30% or less | Not producible |
| Comparative Example 6 | Seriously irregular | Not measurable | 30% or less | Not producible |

The shape shown in Table 1 was determined by observing the particles by an electronic microscope.

The sphericity shown in Table 1 was determined using the formula: $(L1-L2)/L1*100$, wherein L1 represents the length of a diametric line and L2 represents the length of another diametric line, the diametric lines intersecting at the center of each particle at an angle of 30 degrees.

The percentage of target-sized particles shown in Table 1 was determined by the formula: (the amount of the final product having a size of 100 nm or less)/(the amount of the intermediate product).

Table 1 describes that the particles included in the final products of Examples 1 to 6 had a sphericity of −1% to +1%, that is, the particles had substantially complete spherical shape. In contrast, the particles included in the final product of Comparative Example 1 had a spherical shape and a sphericity of −30% or less or +30% or more; hence, the final product thereof had no complete spherical shape. The particles included in the final products of Comparative Examples 2 to 6 had an irregular shape and therefore were not measurable for sphericity.

What is claimed is:

1. Nanometer-size spherical particles:
   wherein each of the particles are made of a metal alloy including an oxide, a carbide, a nitride or a sulfide of the metal alloy;
   wherein the particles include a composite structure of a polycrystalline region having a size of 200 nm or less; and
   wherein each of the nanometer-size spherical particles has a particle size of 1 μm or less, having a sphericity of −10% to +10%.

2. The nanometer-size spherical particles according to claim 1, wherein the metal alloy containing In, Sn, Ga and Bi.

3. The nanometer-size spherical particles according to claim 1, wherein the metal alloy containing Mg, Al, Ba, Eu, and Zn.

4. The nanometer-size spherical particles according to claim 1, wherein the composite structure includes at least two distinguishable regions mixed homogeneously.

5. The nanometer-size spherical particles according to claim 1, wherein the nanometer-size spherical particles are prepared by the steps, comprising:
   a first step for producing intermediate spherical particles, comprising:
      melting a starting material consisting of the metal alloy;
      atomizing the molten starting material into fine droplets;
      solidifying the fine droplets to form the intermediate spherical particles, the intermediate spherical particles including the polycrystalline region, having a particle size of 1 to 300 μm; and
   a second step for producing final spherical particles, comprising:
      providing a swirling plasma gas flow having the central axis thereof, the central axis running through an area between an anode and a cathode of a plasma generator; and
      discharging the intermediate spherical particles along the axis to subject the intermediate spherical particles to a plasma atmosphere of the area to form the final spherical particles.

6. Nanometer-size spherical particles:
   wherein each of the nanometer-size spherical particles has a particle size of 1 μm or less; and a sphericity of −10% to +10%,
   wherein the nanometer-size spherical particles comprise a metal alloy or Si,
   wherein the nanometer-size spherical particles have formed by plasma-treatment of intermediate particles having a particle size of 1 to 300 μm in contact with a reaction gas, the inter mediate particles having formed by atomization,
   wherein the nanometer-size spherical particles include a composite structure of a polycrystalline region including an oxide, a carbide, a nitride or a sulfide of the metal alloy or the Si, the polycrystalline region having a size of 200 nm or less.

* * * * *